Jan. 31, 1967   R. VASSALLI   3,301,199
ALIMENTARY PASTE FOOD PRODUCTION EQUIPMENT
Filed May 15, 1964   2 Sheets-Sheet 1

INVENTOR.
RENZO VASSALLI

United States Patent Office 3,301,199
Patented Jan. 31, 1967

3,301,199
ALIMENTARY PASTE FOOD PRODUCTION
EQUIPMENT
Renzo Vassalli, Uzwil, Switzerland, assignor to Gebrueder Buehler, Uzwil, Switzerland, a company of Switzerland
Filed May 15, 1964, Ser. No. 367,763
Claims priority, application Switzerland, May 16, 1963, 6,160/63
7 Claims. (Cl. 107—7)

This invention relates to paste food production equipment and more particularly to a drying and stripping machine set as commonly used in the production of alimentary paste food articles, such as macaroni, noodles, spaghetti and the like and commonly termed long goods.

It is already common practice in the art to interpose storage means between the drying unit and the stripping and cutting or trimming unit. Such storage means are usually designed for a storage capacity which is sufficient to hold a dryer output of one night or even a weekend from Saturday to Monday morning. Storage means of such a size are rather expensive and require much space. It is however often desirable to keep the equipment in operation for 24 hours and further process the output of the drying plant at once, requiring the crew operating the stripping machine frequently also includings some cutting or trimming mechanism in shifts.

The improved equipment of this invention solves the problems connected with the above mentioned method of operation, enables temporary automatic storage of conveying rods carrying strands of food product during temporary interruptions of operation of the stripping machine, which may occur an account of temporary absence of crew members, temporary break-downs, change from one type of product to another, and the like reasons, and assures fast delivery of these rods after re-start.

A main object of this invention consists in providing a food production equipment which is simple and relatively inexpensive in structure as well as in operation.

A main characteristic feature of the drying and stripping machine set consists in the arrangement in consecutive order a drying unit including a first conveying means, followed by a continuous conveyor, followed in turn by a stripping unit including a third conveying means, said continuous conveyor having a paste food accommodation capacity of less than 10% of the paste food accommodation capacity of said drying unit.

A further development of the basic concept concerns an advantageous modification of the storage conveyor arrangement.

Figure 1:
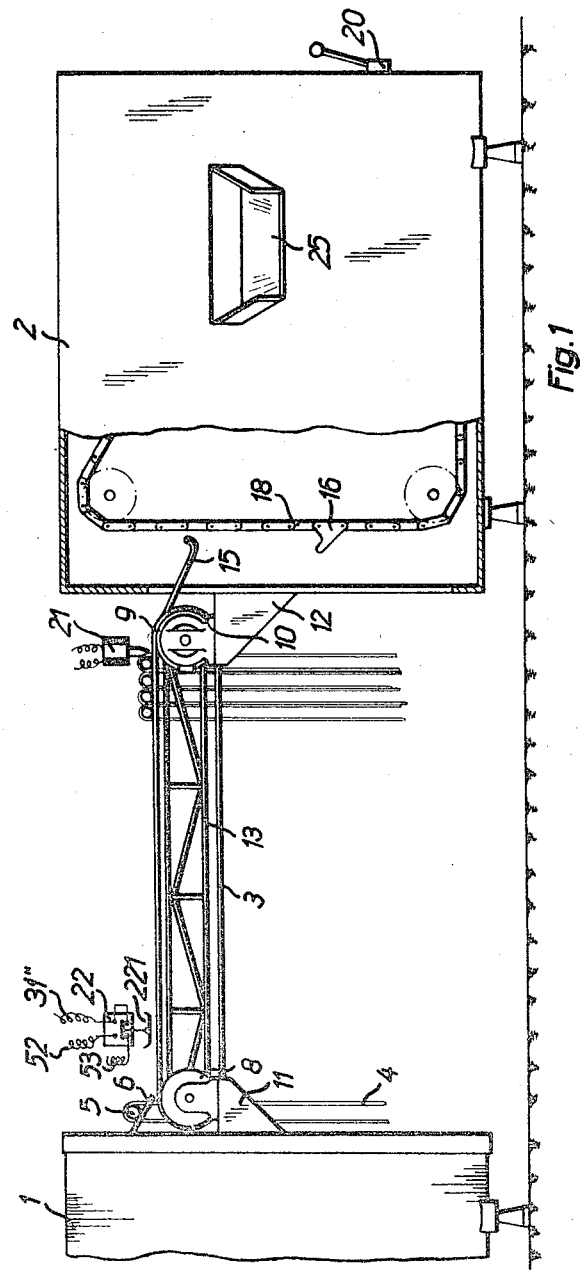
Figure 2:
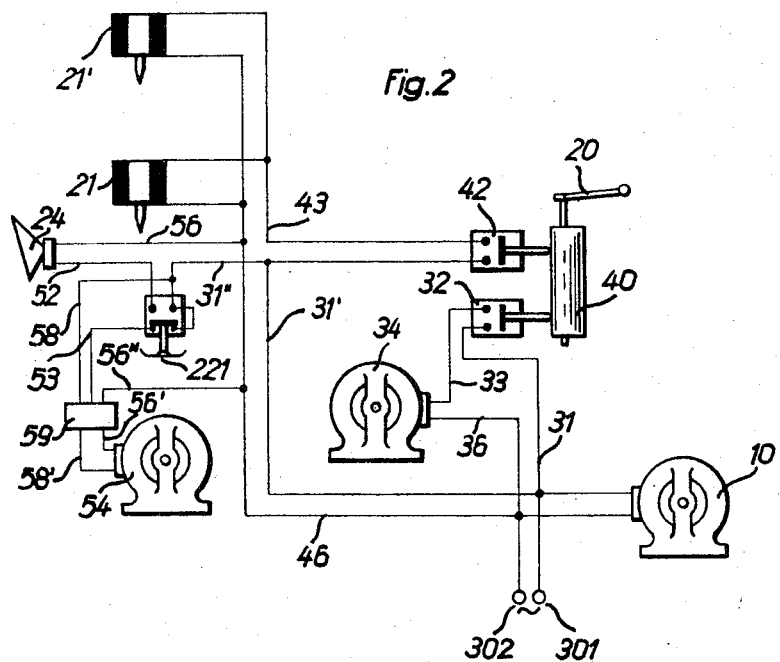
Figure 3:
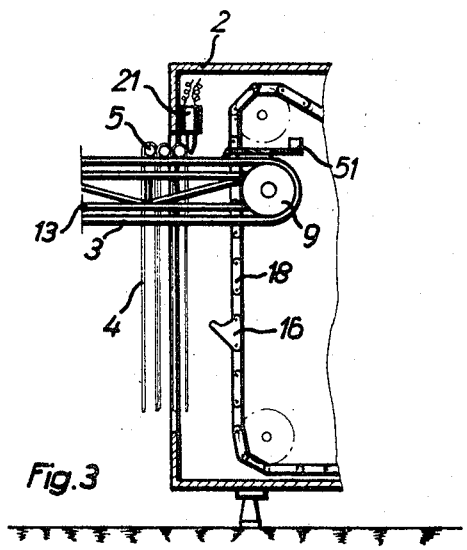

Other subjects and advantages as well as further characteristic features of this invention will become apparent from the following detailed description and the appended drawings showing in FIG. 1 a largely schematic and partially sectional representation of the general arrangement of the food production machine set, FIG. 2 a simplified electric circuit diagram, and FIG. 3 a modification of the discharge arrangement into the stripping unit or station.

Referring now to FIGURE 1 the food production machine set comprises a drying station unit 1 and a stripping station unit 2 usually combined with not shown cutting means. Between the drying unit 1 and the stripping unit 2 a continuous conveyor 3 is disposed. This continuous conveyor 3, preferably a belt conveyor is provided with conveying members consisting of two substantially parallel steel belts having a very smooth surface and spaced apart to support the ends of horizontal conveying sticks or rods 5, each of which rods has positioned thereupon closely spaced, inverted U-shaped loops of strands 4 of alimentary food products such as spaghetti, noodles, macaroni or the like. According to the invention the length of the belt conveyor 3 is designed sufficient to accommodate a load of less or not exceeding 10% of the accommodation capacity of the drying chamber of the drying station unit 1, thus enabling accommodation for a drying unit output of, for example one half to one hour. The conveying rods 5 carrying the food product strand 4 are discharged from the driver 1 onto the continuous conveyor 3 over a chute 6. Each one of the two steel belts of the continuous conveyor 3 is disposed on an individual tension pulley 8 arranged at one end and a driving pulley 9 at the other end of the continuous conveyor. The driving pulleys 9 are geared by an electric motor 10. Brackets 11 and 12 are provided to support the structure 13 of the continuous conveyor 3. A chute 15 is arranged at the discharge end of the continuous conveyor 3 to discharge the rods 5 carrying the food product strands 4 onto lifting dogs 16 of a chain-conveyor 18 disposed in the stripping unit housing 2. The stripping machine 2 is started and stopped respectively by means of a lever or handle 20. Near the discharge end of the continuous belt conveyor 3 a suitable catching mechanism having at least one or more suitably disposed stop members is arranged to arrest the conveying rods 5 carrying loops of food strands 4 arriving on the steel belts of conveyor 3. A suitable full-state mechanism 22, 221, which may comprise an electric switching device 22 and may be actuated for example by a skidding pad 221 is disposed near the opposite end of the continuous conveyor 3 at a distance from the discharge end of the dryer unit 1. The finished product leaves the combined stripping and trimming or cutting unit 2 through a discharge chute 25.

Referring now to FIGURE 2 showing a simplified diagram of the electric control and power supply circuit, a motor control switch 32 is connected to a power supply terminal contact 301 by an electric conductor 31, while another electric conductor 33 connects switch 32 to a motor 34 driving the stripping machine unit 2 and a conductor 36 leads back to a terminal contact 302 of the power supply system. Another, parallel circuit comprising an electric conductor 31', a control switch 42, conductors 43 and 46 energizes solenoid coils of catching mechanisms 21, 21' disposed on both sides at the discharge end of conveyor 3 to arrest or release conveying rods 5 carrying looped food product strands. A suitable switch mechanism 40, e.g. a controller drum, a cam shaft or the like, operable by lever 20 may be used to actuate control switches 32 and 42. In principle, the motor 10 driving conveyor 3 is always switched on. A full-load or full-state safety circuit, comprising electric conductors 31', 31", a full-state control switch 22, conductors 52, an optical and/or accoustic signal device 24, conductors 56 and 46 leading back to terminal contact 302, and further including a conductor 53, a time-delay switch 59, conductor 58 leading back to conductors 31", 56', 56" and 46 leading back to terminal contact 302 and controls motor 54 driving conveyor means disposed in the drying unit 1.

The arrangement described assures a very simple safely operating means for storing temporarily a limited number of conveying rods 5 carrying goods in process delivered one by one, for example every ten seconds, by the dryer 1 onto conveyor 3. This latter operating at a considerably higher speed than the conveyor means of the drying unit 1 then carries the goods towards the stripping and cutting or trimming unit 2, where they are held up temporarily by stop members of the catching mechanisms 21, 21' before leaving conveyor 3 to be delivered to the stripping and trimming unit 2. The steel belts of the conveyor 3 having a very smooth surface glide below the arrested conveying rods 5 which thereby accumulate thereon, for example for three quarters to one hour. During this time operators may be engaged with other occupations, such as removing filled packages or providing empty packing material. As soon as a certain number of rods 5 has accumulated on conveyor 3 the rods 5 arriving last raise a switch operating skidding pad 221 and actuate the full-load or full-state control switch 22 to energize the signal device 24 and simultaneously also the time-delay switch 59, which, after a pre-set time stops the drying unit motor 54, if during this time *no* rods 5 are released by the catching mechanisms 21, 21' and discharged into the stripping and trimming unit 2. In normal condition this discharge may take place every ten to fifteen minutes, i.e. therefore at a considerably higher delivery rate as compared with through-put-rate of the dryer 1.

A characteristic feature of the arrangement described consists in its remarkable simplicity, in the reduction of noise and wear, and in its enabling considerable reductions of labour costs.

In a modification having an extended conveyor 3, as shown in FIGURE 3, the discharge of conveying rods 5 onto the lifting dogs 16 of the chain conveyor 18 disposed within the stripping unit housing 2 takes place directly avoiding thereby provision of the chute 15. A stop member 51 disposed in front of the conveyor chain 18 avoids abutting of the rods 5 against and collision with the chain and at the same time avoids chatter-noise and wear of these component parts.

Instead of an electric control for the independent stripping unit motor 34, the stripping machine 2 may be connected through operable coupling means and a suitable gearing driven by a common motor for both the drying and the stripping units. The coupling may be linked mechanically or electrically to, and actuated by control handle 20. Instead of electro-mechanically operated catching mechanisms 21, 21', arresting the rods 5, purely mechanical means actuated by chain 18 may further be provided for the same purpose, without departing from the spirit of this invention.

I claim:

1. A system for the production of strands of an alimentary paste food product comprising a drying device having means for discharging at a first speed rate a series of rods over which a loop of the alimentary paste product is draped, a stripper device having means for picking up each rod for advancing the rod at a second speed rate into association with means for stripping the alimentary paste material from the rod, a conveyor located between said drying device and said stripper device for supporting said rods and for transporting said rods from said drier device to said stripper, a catching mechanism adjacent said conveyor and preventing discharge of said rods from said conveyor to said stripper so that the rods coming from said drier will be stored on said conveyor, and switching means located adjacent said conveyor and connected to said catching mechanism discharge of said rods from said conveyor at a rate to supply rods to said stripper device operating at said second speed rate.

2. A system according to claim 1, wherein said conveyor includes a surface permitting said rods to slip as said rods are held against movement thereon.

3. A system according to claim 2, wherein said conveyor comprises two spaced steel belts having a surface permitting slippage of said rods and supporting said rods on each side of the draped alimentary paste product.

4. A system according to claim 1, wherein said switching means includes a switch member disposed over said conveyor at a location adjacent said drier and being actuable by rods passing along said drier and accumulating thereon below said switching mechanism.

5. A system according to claim 1, including a discharge chute extending from said conveyor into said stripper, said stripper including an endless conveyor having a lifting dog arranged to move below said discharge chute and move each rod in succession therefrom.

6. A system according to claim 1, wherein said conveyor extends into said stripper, said catching mechanism being located within said stripper, and a stop member disposed adjacent the portion of said conveyor within said stripper for preventing movement of rods released by said catching member.

7. A device according to claim 1 wherein said conveyor is of a length sufficient to accommodate a number of rods equal to at least ten percent of the capacity of said drier.

References Cited by the Examiner

UNITED STATES PATENTS

| | | | |
|---|---|---|---|
| 2,504,339 | 4/1950 | Mariani | 107—7.8 |
| 2,622,545 | 12/1952 | Hummel | 107—7.8 |
| 2,649,055 | 8/1953 | Borrelli | 107—7.8 |
| 2,730,050 | 1/1956 | Braibanti et al. | 107—7.8 |
| 2,813,498 | 11/1957 | Senzani | 107—7.8 |

WALTER A. SCHEEL, *Primary Examiner.*

R. W. JENKINS, *Assistant Examiner.*